(12) United States Patent
Hartlaub (10) Patent No.: US 8,029,055 B2
(45) Date of Patent: Oct. 4, 2011

(54) ACTIVE HEAD RESTRAINT FOR A VEHICLE

(75) Inventor: Silvio Hartlaub, Cologne (DE)

(73) Assignee: Johnson Controls GmbH, Burscheid (DE)

( * ) Notice: Subject to any disclaimer, the term of this patent is extended or adjusted under 35 U.S.C. 154(b) by 500 days.

(21) Appl. No.: 11/547,217

(22) PCT Filed: Mar. 22, 2005

(86) PCT No.: PCT/EP2005/003014
§ 371 (c)(1),
(2), (4) Date: Sep. 29, 2006

(87) PCT Pub. No.: WO2005/097545
PCT Pub. Date: Oct. 20, 2005

(65) Prior Publication Data
US 2008/0272631 A1    Nov. 6, 2008

(30) Foreign Application Priority Data

Mar. 31, 2004  (DE) .......................... 10 2004 016 474

(51) Int. Cl.
*B60R 21/00* (2006.01)
(52) U.S. Cl. .................................. 297/216.12
(58) Field of Classification Search ............. 297/216.12, 297/383, 409, 284.8
See application file for complete search history.

(56) References Cited

U.S. PATENT DOCUMENTS

| | | | | |
|---|---|---|---|---|
| 3,112,137 A * | 11/1963 | Drenth | ....................... | 297/284.3 |
| 4,944,554 A * | 7/1990 | Gross et al. | ................ | 297/284.3 |
| 5,738,412 A * | 4/1998 | Aufrere et al. | ................ | 297/408 |
| 5,934,750 A * | 8/1999 | Fohl | ......................... | 297/216.12 |
| 6,213,548 B1 | 4/2001 | Van Wynsberghe et al. | | |
| 6,767,064 B2 * | 7/2004 | Veine et al. | .................... | 297/391 |
| 6,805,411 B2 * | 10/2004 | Gramss et al. | ................ | 297/408 |

FOREIGN PATENT DOCUMENTS

| | | | |
|---|---|---|---|
| DE | 39 00 495 A1 | | 7/1990 |
| DE | 296 03 991 U1 | | 7/1996 |
| DE | 296 09 786 U1 | | 7/1996 |
| DE | 199 23 909 A1 | | 1/2000 |
| DE | 199 41 712 C1 | | 10/2000 |
| DE | 201 14 944 U1 | | 1/2003 |
| DE | 10215137 A | * | 8/2003 |
| DE | 10 2004 016 474 B3 | | 8/2005 |
| GB | 2403137 A | * | 12/2004 |
| JP | 403213480 A | * | 9/1991 |
| WO | WO 00/35707 A1 | | 6/2000 |

OTHER PUBLICATIONS

International Search Report for PCT/EP2005/003014, date of mailing Jan. 12, 2005, 2 pages.

* cited by examiner

*Primary Examiner* — Milton Nelson, Jr.
(74) *Attorney, Agent, or Firm* — Foley & Lardner LLP (57) ABSTRACT

A head restraint for a vehicle seat is provided. The head restraint includes a head restraint subsection and a driving device. The head restraint subsection is movable from a use position to a safety position, while the driving device is configured to move the head restraint subsection from the use position to the safety position. The driving device includes at least two components which are movable with respect to each other under the action of a first force. At least one component has an oblique surface which acts on the other component and is inclined in relation to a direction of the first force. Movement of the at least one component under the action of the first force transmits a second force on the other component in a direction different than the first force.

22 Claims, 8 Drawing Sheets

ACTIVE HEAD RESTRAINT FOR A VEHICLE

CROSS-REFERENCE TO RELATED PATENT APPLICATIONS

The present Application is a National Phase Application of PCT/EP2005/003014 entitled, "Head Restraint; in Particular for a Motor Vehicle" filed on Mar. 22, 2005 which published under PCT Article 21(2) on Oct. 20, 2005 as WO 2005/097545 A1 in the German language, which claims priority to German Patent Application DE 10 2004 016 474.6 filed Mar. 31, 2004, the entire disclosure of which, including the specification and drawings, is expressly incorporated herein by reference.

BACKGROUND

The present invention relates to a head restraint for a vehicle seat. More specifically, the present invention relates to a head restraint wherein at least a portion of the head restraint moves from a use position toward the head of the seat occupant into a safety position in the event of an accident (i.e. an active head restraint).

German Publication No. DE 199 23 909 A1 discloses a head restraint according to the generic type. The disclosed head restraint comprises a basic body which is connected rigidly and/or height-adjustably to the backrest of the vehicle seat via retaining bars. The basic body is arranged in a padded segment of a trough-like design. In the event of an accident, the padded segment is moved in a translatory manner toward the head of the seat occupant to reduce the likelihood of a whiplash trauma. The force required for moving the basic body is produced by a spring, which is prestressed in the direction of displacement, within a telescopic guide device.

German Publication No. DE 39 00 495 A1 describes a further head restraint according to the generic type, in which a padded segment is configured to pivot forward in relation to the basic body about a fixed axis of rotation in the event of an accident. A spring-loaded piston/cylinder arrangement in conjunction with a supporting lever, in which arrangement the piston rod is coupled to the basic body in the region of the axis of rotation and the cylinder is coupled to the padded segment, serves as driving device.

Furthermore, German Publication No. DE 199 41 712 C1 discloses a head restraint, in which a shiftable padded element is connected to the basic body via a scissors-type mechanism, by means of which the padded element can be moved forward from a rest position into a use position.

There is a need for an active head restraint with an effective driving device of simple and compact construction.

SUMMARY

One exemplary embodiment relates to an active head restraint having a driving device. The driving device includes at least two components which are movable with respect to each other under the action of a first force. At least one component has an oblique surface which acts on the other component and is inclined in relation to the direction of the first force and by means of which a second force which deviates from the first direction of force and can be transmitted to the head restraint can be produced. This can take place, for example, after release of a locking device retaining the components in an initial position.

According to an exemplary embodiment, only one of the components is equipped with a corresponding oblique surface. According to another exemplary embodiment, both components are equipped with oblique surfaces which act with each other and run parallel.

According to another exemplary embodiment, the head restraint is rotatably connected to the backrest of the vehicle seat via an articulated lever having a lever arm which extends on the other side of the axis of rotation and can be shifted rearward by the driving device. In such an embodiment, the head restraint can be moved as a whole toward the head of the seat occupant.

According to another exemplary embodiment, the head restraint has a basic body and a padded segment which can be shifted in relation to the latter toward the head of the seat occupant under the action of the driving device, since the mass which is to be accelerated is reduced in this design.

According to another exemplary embodiment, the components are movable relative to each other with sliding friction (i.e. are not provided with rolling bodies which roll on the oblique surfaces). By relying on sliding friction, the construction of the driving device is simplified. Furthermore, the sliding friction can be used in a specific manner to keep the head restraint frictionally in the safety position when this position is reached.

According to another exemplary embodiment, the relative movement between the components has a translatory (e.g., fore and aft, etc.) component. However, a rotation between the components may additionally also be provided. According to such an embodiment, the components can be set into rotation in relation to each other under the action of a first force, with a translatory relative movement of the components in the direction of the axis of rotation being producible by the oblique surface(s).

According to another exemplary embodiment, the driving device has at least three components which are movable with respect to one another and of which the central component is rotatable in relation to the other rotationally fixed components.

In the case of the two last-mentioned exemplary embodiments, the components may be advantageously arranged telescopically one inside another in the use position, the oblique surface(s) being arranged on the inner and/or outer radial surface of at least one component and being designed in the manner of a thread. A relatively compact construction of the driving device is thereby made possible.

According to another exemplary embodiment, the locking device may in principle act between the relatively movable components of the driving device. According to another exemplary embodiment, the padded element is locked directly to the basic body by the locking device. In such an embodiment, further spring means which are prestressed (e.g., tensioned, biased, loaded, etc.) in the direction of displacement directly between the basic body and padded element and which support the driving device can be provided.

According to another exemplary embodiment, the oblique surfaces are provided with a toothing by means of which the head restraint can be locked at least temporarily at the latest when the safety position is reached. Such an embodiment may be used if the friction between the components is not sufficient to hold the head restraint after the safety position is reached. The locking is preferably triggered by the head impacting against the head restraint and is subsequently cancelled again, with the head restraint being able to be moved back again back into the initial position by a spring after the locking is ended.

According to another exemplary embodiment, the first force can advantageously be produced by a mechanical or chemical energy store, for example springs, pyrotechnic drives or the like, arranged within the head restraint.

According to another exemplary embodiment, provision may be made for the first force and/or the force for unlocking the locking device to be produced at least partially in the vehicle seat by the inertia of the seat occupant. A device suitable for this purpose is described, for example in German Publication No. DE 10 2004 048 910, the complete disclosure of which is hereby incorporated by reference.

According to another exemplary embodiment, the first force and/or the force for unlocking the locking device can furthermore be brought about at least partially by an accident-induced shifting of the vehicle seat or of parts of the same relative to the vehicle body, or else by deformation of the vehicle body. For example, a belt tensioner is suitable for producing these forces.

According to another exemplary embodiment, force transmission means, which are designed, for example, as a Bowden cable, can be arranged between the force production site for the first force, which site is arranged in or on the other side of the vehicle seat, and the head restraint. According to another exemplary embodiment, linkages or hydraulic transmission means are likewise also suitable.

DETAILED DESCRIPTION

Figure 1A:
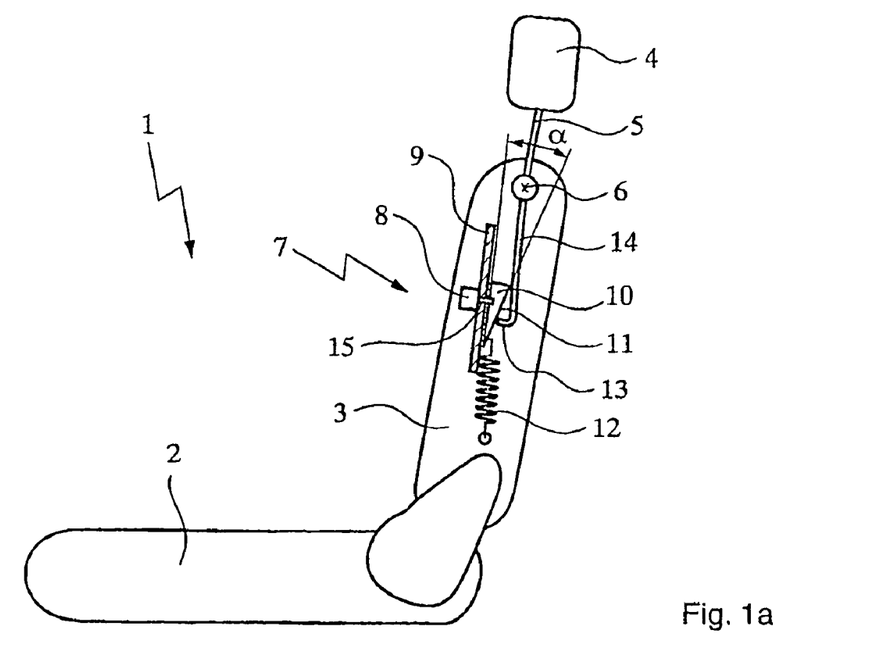
FIG. 1a is a side view of a vehicle seat with a head restraint according to an exemplary embodiment with the head restraint shown in a first position.
Figure 1B:
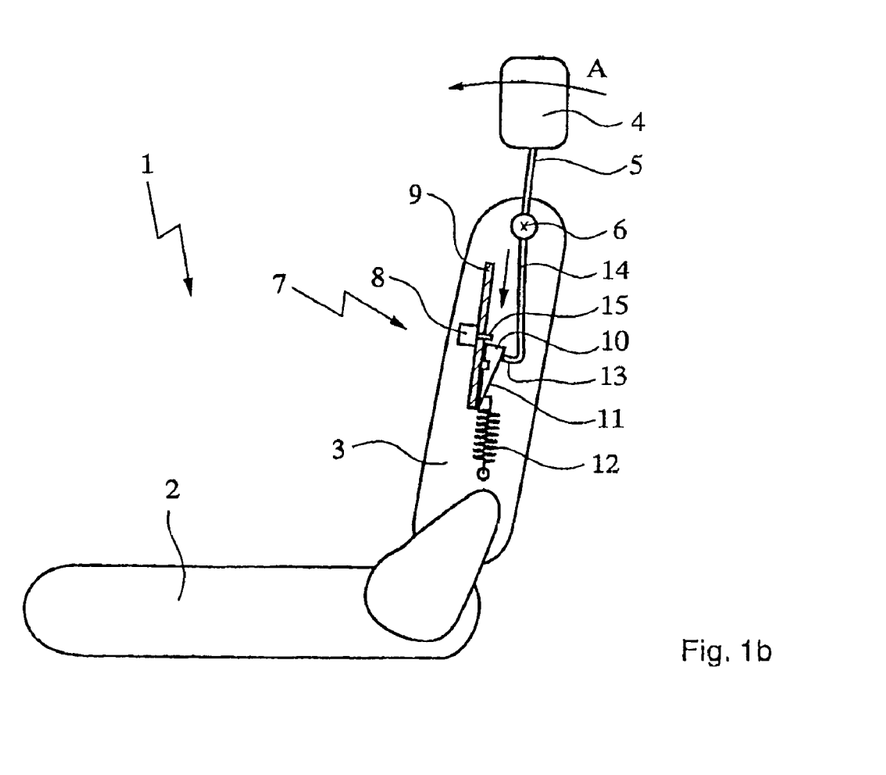
FIG. 1b is a side view of the vehicle seat and head restraint of FIG. 1 with the head restraint shown in a second position.

FIGS. 1a and 1b show a vehicle seat 1 according to an exemplary embodiment. The vehicle seat 1 comprises a seat part 2 and a backrest 3 which is connected in an inclination-adjustable manner to the latter and is equipped with a head restraint 4. The paired retaining bars 5 of the head restraint 4 are pivotably connected to the backrest 3 in the upper backrest region via a joint 6, so that, in the event of an accident, the head restraint 4 can be pivoted by rotation of the retaining bars 5 in the joint 6 from a first or use position (shown in FIG. 1a) toward the head of the seat occupant (the direction of which is shown by the arrow A) into a second or safety position (shown in FIG. 1b). The movement or shifting of the head restraint 4 between the use position and the safety position opposes an overextension of the cervical vertebrae of the seat occupant (anti-whiplash effect).

The force required for this shifting is produced by a driving device 7 which in normal use is blocked by a locking device 8. The driving device 7 comprises a wedge-shaped first component 10 which is mounted in a vertical longitudinal guide 9 and has an oblique surface 11 which is inclined by an angle α in relation to the direction of force of a prestressed (e.g., tensioned, biased, loaded, etc.) spring 12. A second component 13 in the form of a lever arm 14, which is rigidly connected to the retaining bars 5 and extends on the other side of the joint 6 into the frame of the backrest 3, bears against the oblique surface 11. The locking device 8 is equipped with a displaceable bolt 15 which, in the blocking position, leads or otherwise extends through the longitudinal guide 9 into the first component 10 and locks the latter.

Referring to FIG. 1b in particular, in the event of an accident (e.g., a rear impact, etc.), the locking device 8 is released by the bolt 15 being pulled back. According to an exemplary embodiment, a solenoid coupled to the controlling means of the vehicle airbag may be provided to pull back the bolt 15 or otherwise release the locking device 8. With the locking device 8 released, the wedge-shaped first component 10 can now move downward under the action of the spring 12, with the oblique surface 11 shifting the second component 13, which bears frictionally against it, namely the lower end of the lever arm 14, downward. In the process, the head restraint 4 is pivoted into the safety position.

Figure 2:
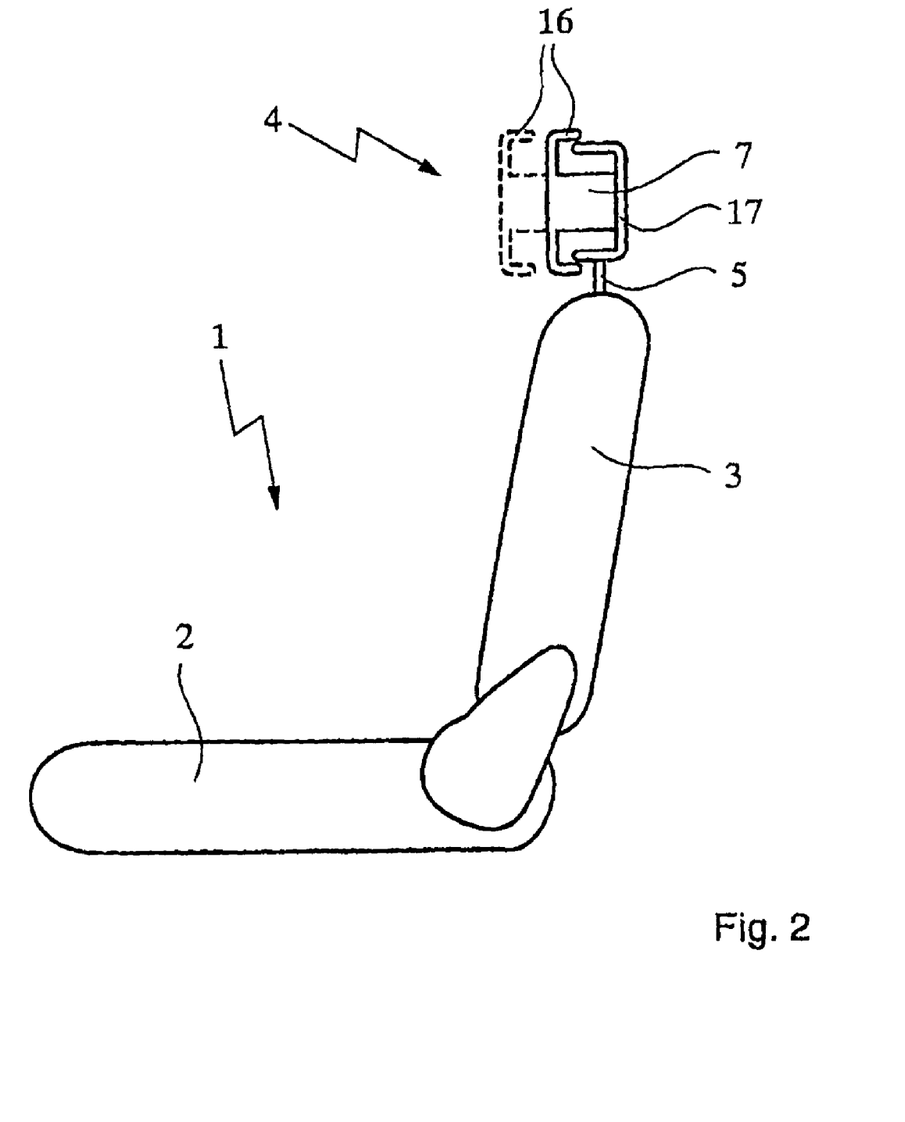
FIG. 2 is a side view of a vehicle seat and a head restraint according to another exemplary embodiment.

FIG. 2 shows a vehicle seat 1 and a head restraint 4 according to another exemplary embodiment. Unlike the head restraint 4 of FIG. 1, the head restraint 4 of FIG. 2, in the event of an accident, is not transferred as a whole into a second or safety position, but rather only a subsection in the form of a padded element 16 is shifted or otherwise moved toward the head of the seat occupant. The basic body 17 of the head restraint 4 is rigidly connected, if desired, also adjustable in height, via the retaining bars 5, to the backrest 3. A driving device 7, described in detail below, which brings about the shifting, is arranged within the head restraint, between the padded element 16 and the basic body 17.

Referring to FIGS. 3a through 3d, the driving device 7 comprises a first component 10 in the form of a hollow cylinder 18 which is rotatably connected about an axis of rotation 19 to the basic body 17 of the head restraint 4. A tab 21 of the basic body 17, which tab protrudes axially into the hollow cylinder 18 in the region of an arcuate recess 20, serves to support a prestressed spring 12 which is arranged in the hollow cylinder 18 and bears at its other end against a radially inwardly protruding projection 22 of the hollow cylinder 18. In a first or use position (shown in FIGS. 3a and 3b), a locking device 8 locks the rotation of the hollow cylinder 18 relative to the basic body 17. According to an exemplary embodiment, the locking device 8 is similar to the locking device described above with reference to FIGS. 1a and 1b. In such an embodiment, the locking device 8 locks the rotation of the hollow cylinder 18 relative to the basic body 17 by means of a bolt 15 pushed into the hollow cylinder 18, and thereby keeps the spring 12 under tension.

Figure 3A:
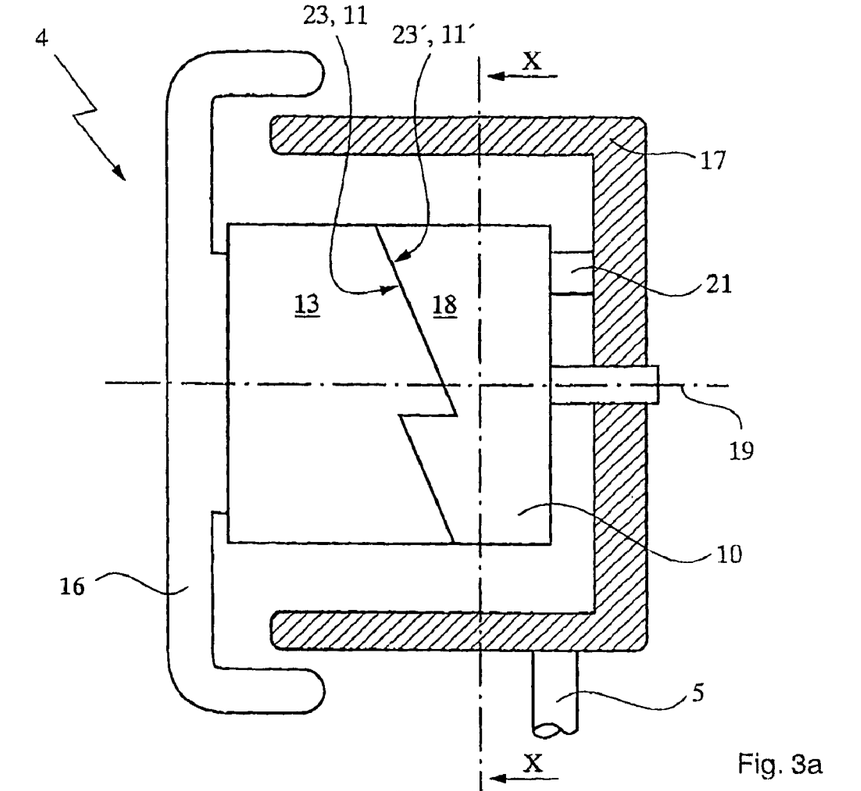
FIG. 3a is side sectional view of the head restraint of FIG. 2 shown in a first position.
Figure 3B:
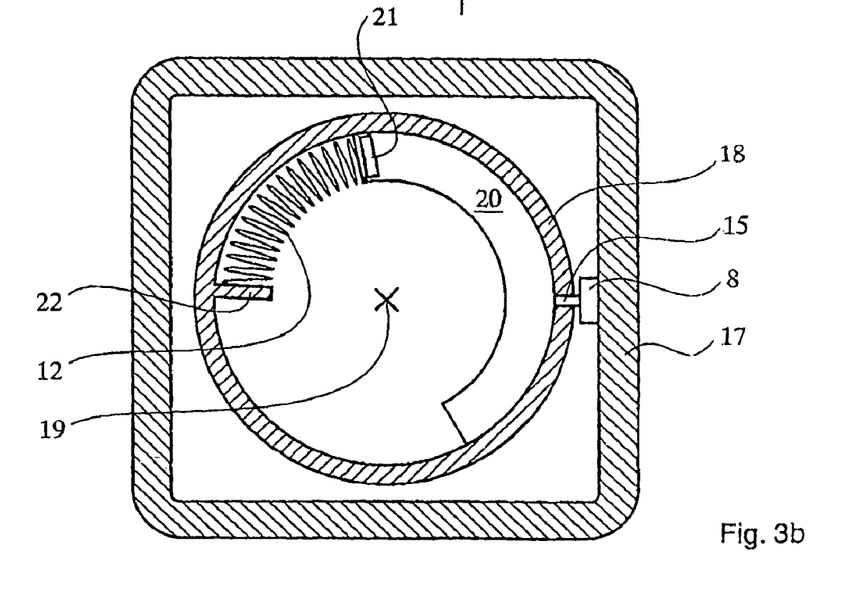
FIG. 3b is a front sectional view of the head restraint of FIG. 2 shown in the first position.

The front end surface 23 of the hollow cylinder 18 is provided with sawtooth-like oblique surfaces 11 which are distributed over the circumference of the same and which bear against the oblique surfaces 11' of a congruently designed, second component 13, which is likewise designed as a hollow cylinder 18' having an end surface 23'. The hollow cylinder 18' is connected rigidly and therefore also in a rotationally fixed manner to the padded part 16.

Figure 3C:
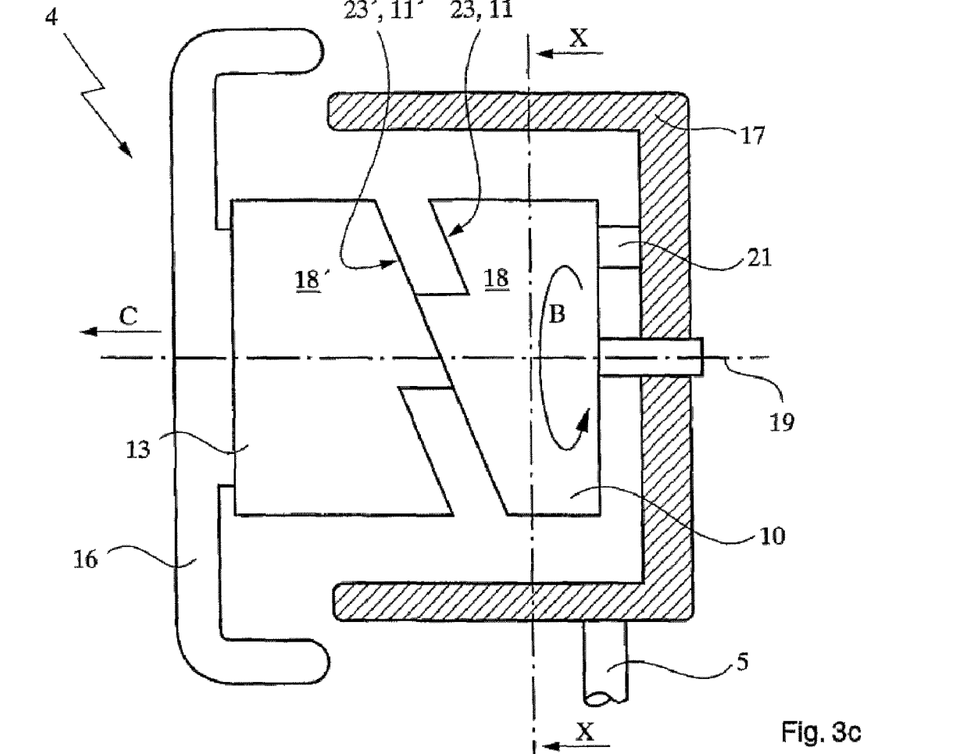
FIG. 3c is a side sectional view of the head restraint of FIG. 2 shown in a second position.
Figure 3D:
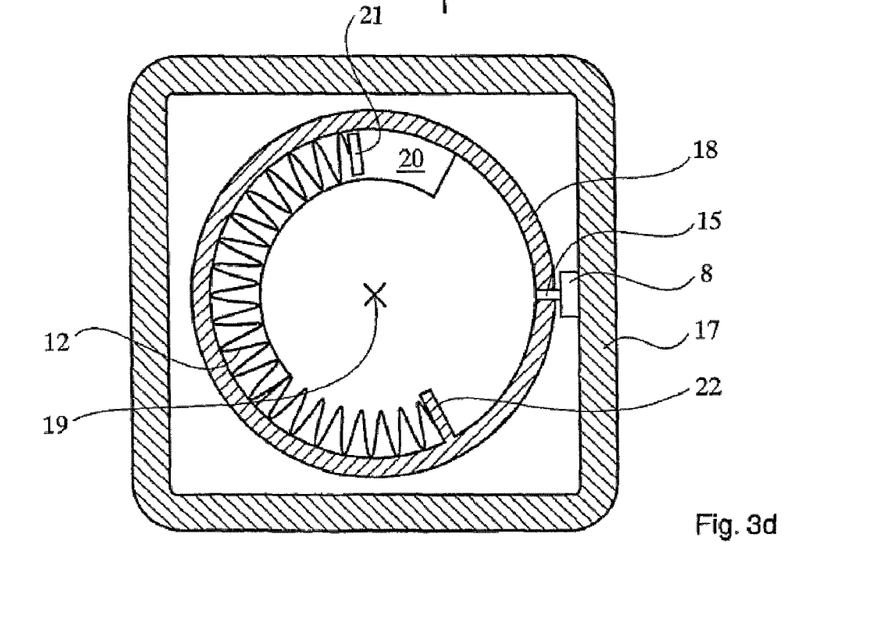
FIG. 3d is a front sectional view of the head restraint of FIG. 2 shown in the second position.

Referring to FIGS. 3c and 3d, in the event of an accident, the locking device 8 is released so that the relaxing spring 12 rotates the first component 10 (hollow cylinder 18) in relation to the second component 13 (hollow cylinder 18'). The direction of rotation of the first component 10 relative to the second component 13 is shown by arrow B in FIG. 3c. The oblique surfaces 11, 11' rubbing on each other bring about an axial force and a shifting of the hollow cylinder 18' forward in the direction of the axis of rotation 19 and therefore also a displacement of the padded body 16 in relation to the basic body 17 in the direction of the arrow C.

Figure 4A:
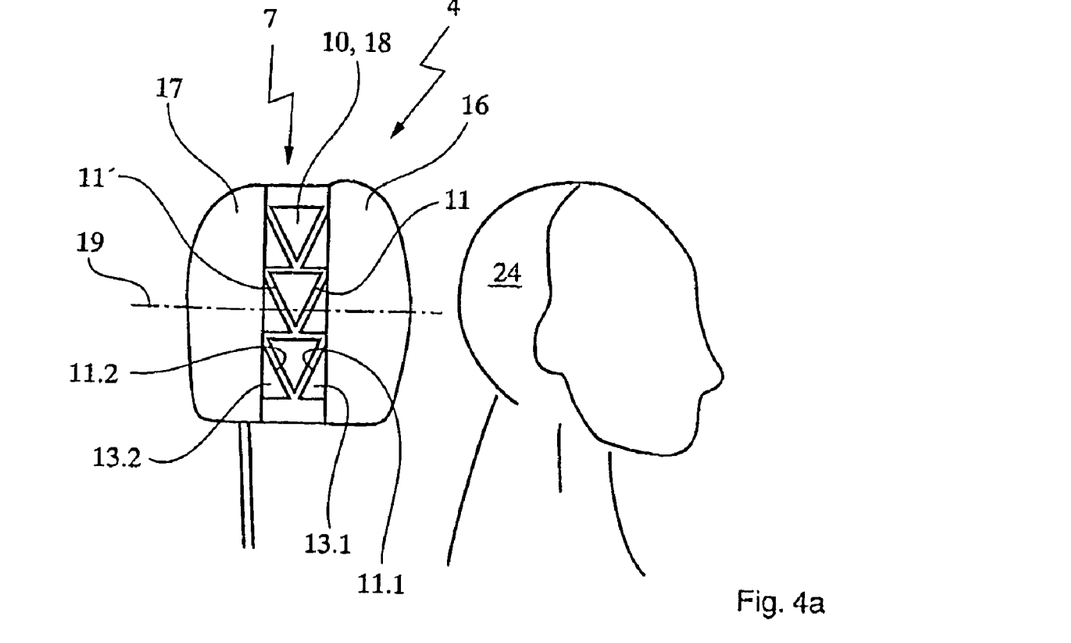
FIG. 4a is a side view of a head restraint according to another exemplary embodiment and shown in a first position.
Figure 4B:
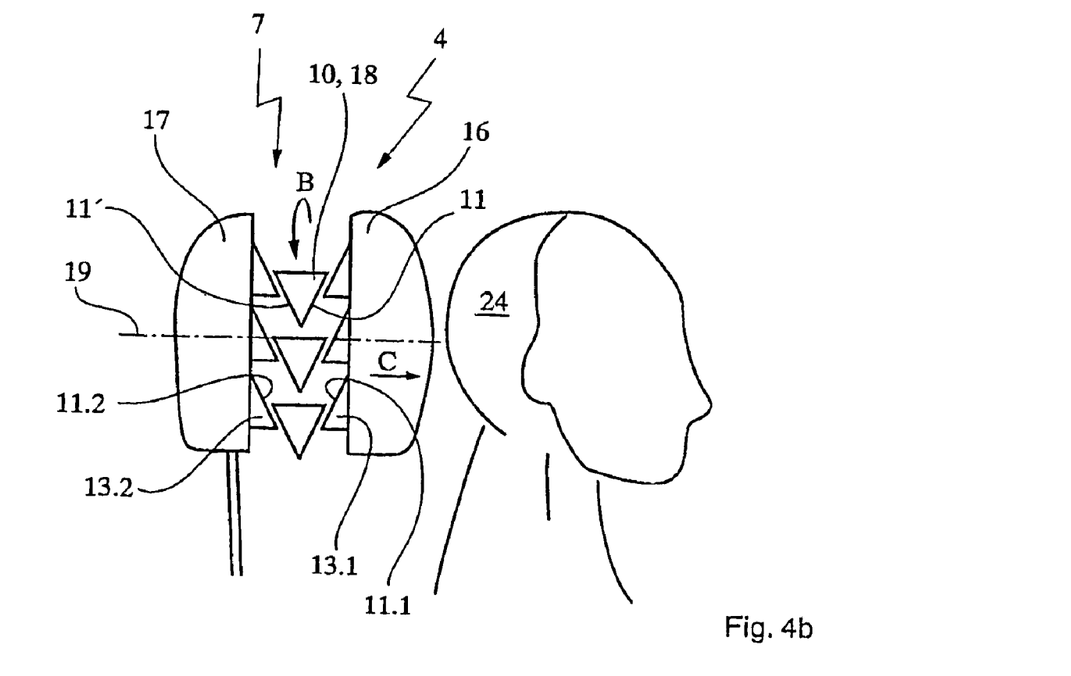
FIG. 4b is a side view of the head restraint of FIG. 4a shown in a second position.

FIGS. 4a and 4b show a head restraint 4 according to another exemplary embodiment. According to the embodiment illustrated, the padded segment 16 of the head restraint 4 is shifted in relation to the basic body 17 from the first or use position (shown in FIG. 4a) in the direction of the arrow C into the second or safety position (shown in FIG. 4b) by a driving device 7 which has two components 13, 13.1 which are rigidly connected to the padded segment 16 and to the basic body 17 and have oblique surfaces 11.1, 11.2. Arranged between the components 13.1, 13.2 is a further component 10 in the form of a hollow cylinder 18 with oblique surfaces 11, 11' effective axially on both sides. This further component is rotatable about the horizontal axis 19 running in the direction of travel (e.g., x-direction of the vehicle, fore and aft direction of the vehicle, etc.). During its rotation (the direction of which is shown by arrow B in FIG. 4a), the components 13.1, 13.2 are driven apart, as a result of which the padded segment 16 is moved toward the head 24.

Figure 5A:
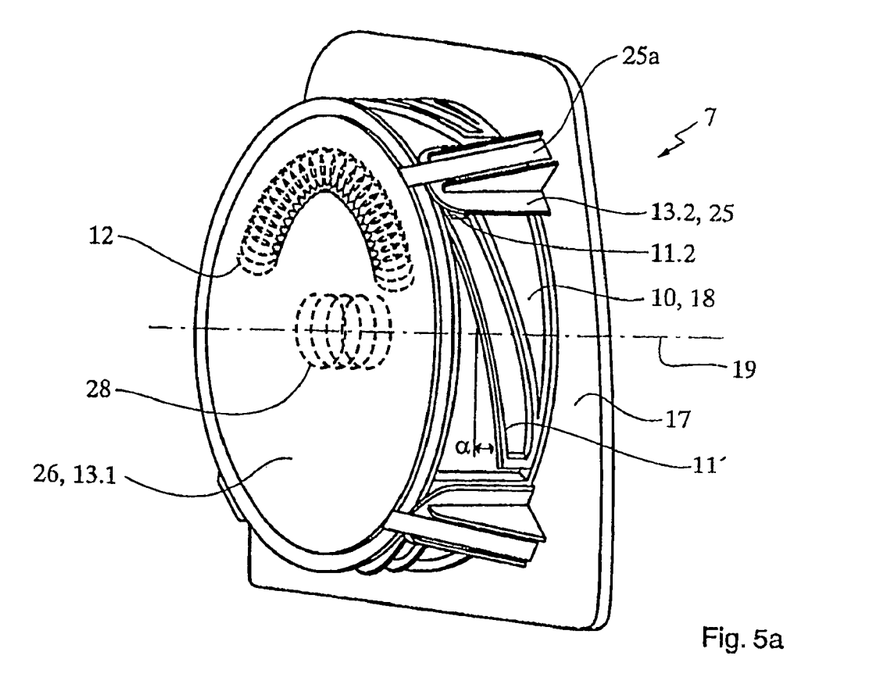
FIG. 5a is perspective view a driving device insertable into the head restraint of FIG. 4a with the driving device shown in a first position.
Figure 5B:
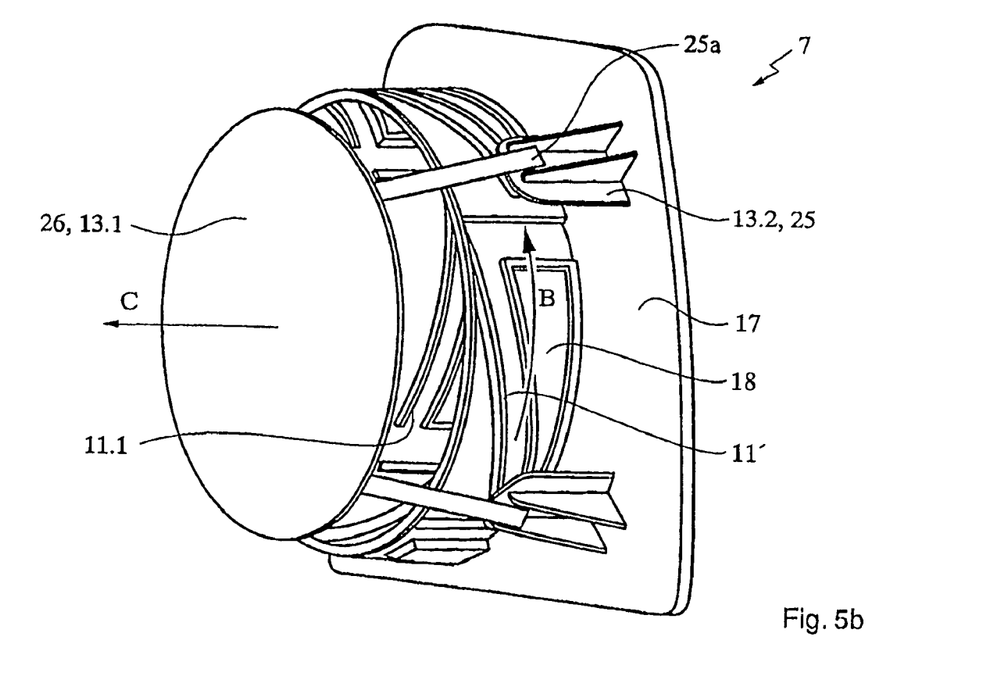
FIG. 5b is a perspective view of the driving device of FIG. 5a shown in a second position.

FIGS. 5a and 5b show a driving device 7 according to an exemplary embodiment. The driving device 7 is suitable for use as the driving device 7 described above with reference to FIGS. 4a and 4b. According to the embodiment illustrated, the driving device 7 comprises, as the rotationally fixed components 13.1, 13.2, four protruding circularly arranged projections 25 which are integrally formed in the basic body 17, and a cylinder 26 which is connected in a rotationally fixed manner to the padded segment. The components 13.1 and 13.2 are secured against rotation with respect to each other by linear guides 25a. The rotatable hollow cylinder 18 is telescopically enclosed by the components 13.1 and 13.2, the hollow cylinder having slotted-link-like oblique surfaces 11' (on the outside), 11 (on the inside, not visible) on its inner and outer radial surfaces. These oblique surfaces are inclined by an angle α of approximately 10° to 30°, preferably 15° to 20°, in relation to the direction of force of a spring 12 which is prestressed in the tangential direction within the driving device 7 and is supported on the hollow cylinder 18 and on the basic body 17. The greater the setting of the inclination, the more rapidly is the padded part 16 moved forward in the event of an accident. However, the spring forces required for this purpose also increase as the angle α increases and the desired locking of a shifting-back after the safety position is reached decreases.

Suitably shaped oblique surfaces 11.2 protruding radially inward from the projections 25 engage in the outer, slotted-link-like oblique surfaces 11' while the inner oblique surfaces 11 of the hollow cylinder 18 interact with congruent oblique surfaces 11.1 of the cylinder 26 which is hollowed out in the manner of a cup. In a manner similar to the embodiment illustrated in FIG. 3, a spring 12 running equidistantly to the inner surface area of the hollow cylinder 18 is arranged in the interior of the telescopic driving device 7.

Figure 6:
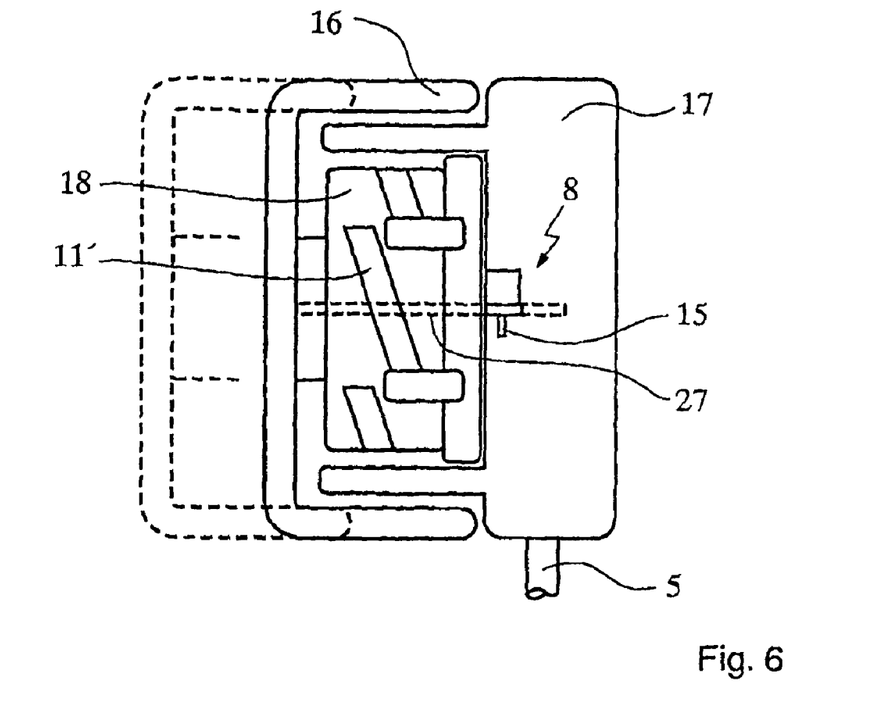
FIG. 6 is a side sectional view of a head restraint with a locking device according to an exemplary embodiment.

In the first or use position (shown in FIG. 5a), the basic body 17 and the padded element 16 are secured with respect to each other by a locking device 8 (shown in FIG. 6) acting in the direction of the axis 19, thus not only preventing an axial shifting of the components 10, 13.1 and 13.2, but also their rotation with respect to one another. The spring 12 therefore remains in its prestressed state. If the locking device 8 is released, the spring 12 is capable of rotating the hollow cylinder 18 in relation to the component 13.2 of the basic body 17 in such a manner that said hollow cylinder is displaced forward in the direction of the arrow C. The direction of rotation of the hollow cylinder 18 is illustrated by the arrow B. Since, in this connection, a rotation of the hollow cylinder 18 relative to the component 13.1 of the padded segment 16 inevitably also takes place, these elements are also shifted linearly with respect to one another in the direction of the arrow C. The overall linear shifting of the padded segment 16 with respect to the basic body 17 is a combination of the displacements of the component 13.2 relative to the rotatable hollow body 18 and of the hollow body 18 relative to the component 13.1.

By rotating back the hollow cylinder 18, for example by means of a tool which can be passed through the head restraint 4 from the outside, the driving device 7 is brought into its starting position again, with the spring 12 being prestressed.

According to an exemplary embodiment, it is possible also to undertake the locking of the driving device 7, which locking can be released in the event of an accident, by means of a blocking device which directly prevents the rotation of hollow cylinder 18 and component 13.2 with respect to each other, for example by means of a bolt latching radially inward through the projection 25 into the hollow cylinder 18. However, by means of the locking device 8 which is advantageously used, acts in the axial direction and may comprise, for example, a rod 27 which is fitted fixedly onto the component 13.1, runs within the hollow cylinder 18 and penetrates the component 13.1 (shown in FIG. 6), there is the possibility of arranging within the driving device 7 a further spring 28 which acts exclusively in the direction of the axis 19, is supported on the components 13.1 and 13.2 and immediately drives the components 13.1 and 13.2 axially apart after release of the locking device 8.

According to various alternative embodiments, instead of a rotation, the oblique surfaces 11, 11' may also be displaced linearly downward in relation to the congruently designed oblique surfaces 11.1, 11.2 in order to obtain the effect desired by the head restraint. According to still further alternative embodiments, the oblique surfaces 11, 11' may be of curved design instead of planar design.

Figure 7:
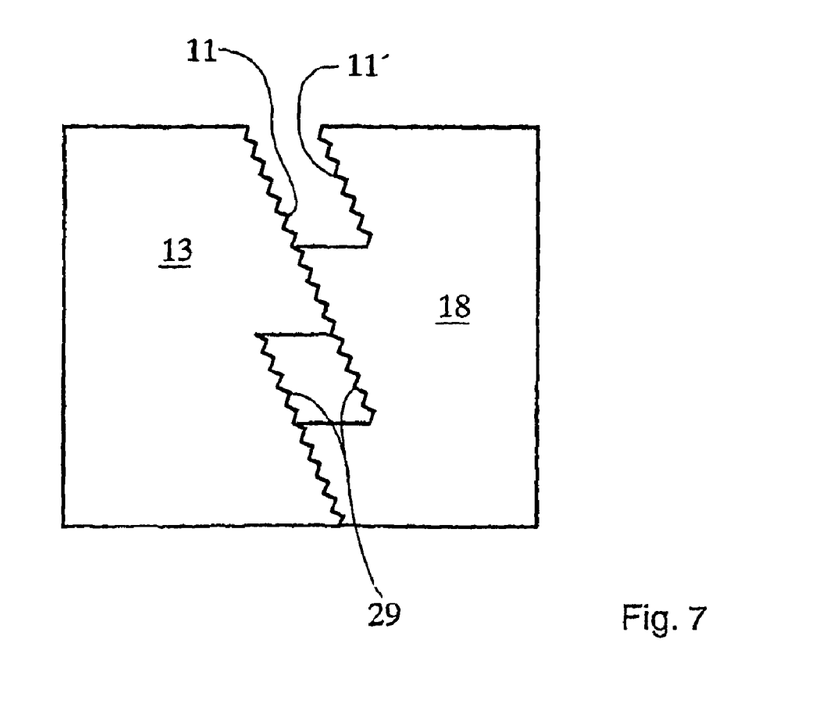
FIG. 7 is a partial side sectional view of a driving device according to an exemplary embodiment with a toothing suitable for locking a head restraint in a second position.

Referring to FIG. 7, the oblique surfaces 11, 11' may be provided with a toothing 29 which opposes an undesired resetting of the driving device 7 after the safety position is reached. If the oblique surfaces 11, 11', 11.1, 11.2 are part of a slotted-link-like guide, as illustrated in FIGS. 5a and 5b, those surfaces of the slotted-link guide which bring about the advancing of the padded element 16 and are subsequently pressed onto one another by a force acting from the padded element 16 in the direction of the basic body 17 are to be provided with a toothing.

Figure 8:
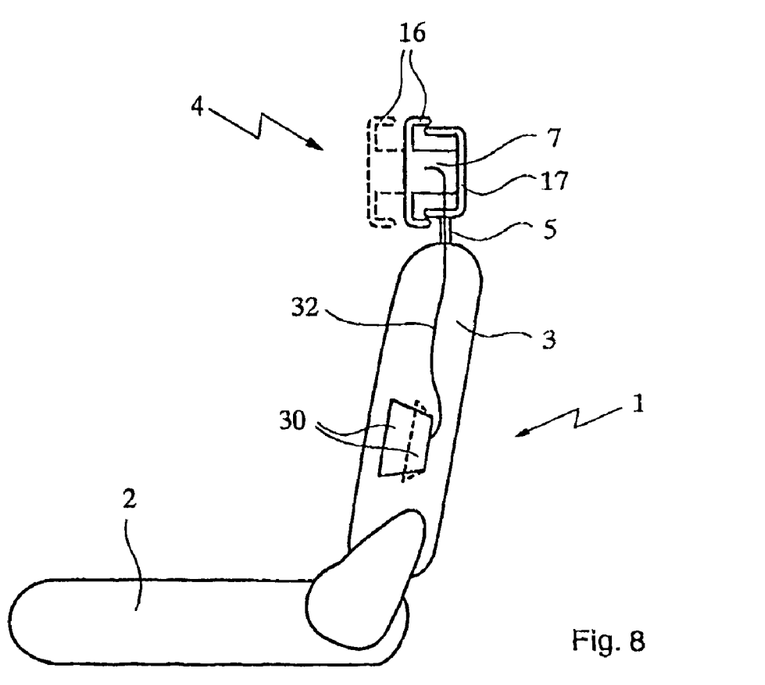
FIG. 8 is a side view of a vehicle seat and a head restraint according to another exemplary embodiment.

FIG. 8 shows a vehicle seat 1 with a head restraint 4 an exemplary embodiment, in which the first force is produced indirectly by inertia detection means 30 situated in the backrest 3 of the vehicle seat. The inertia detection means 30 are actuated, in the case of a rear impact, by the seat occupant plunging, as a consequence of inertia, into the upholstery of the backrest 3 and, in the process, undergo a shifting from the initial position into the crash position (illustrated by dashed lines). A force transmission means 31 in the form of a Bowden cable 32 connects the inertia detection device 30 to the head restraint 4 through a retaining bar 5. In the event of a rear impact, the rearward shifting of the inertia detection means 30 therefore leads to a shifting of the padded element 16 forward into its safety position (likewise shown by dashed lines).

Figure 9:
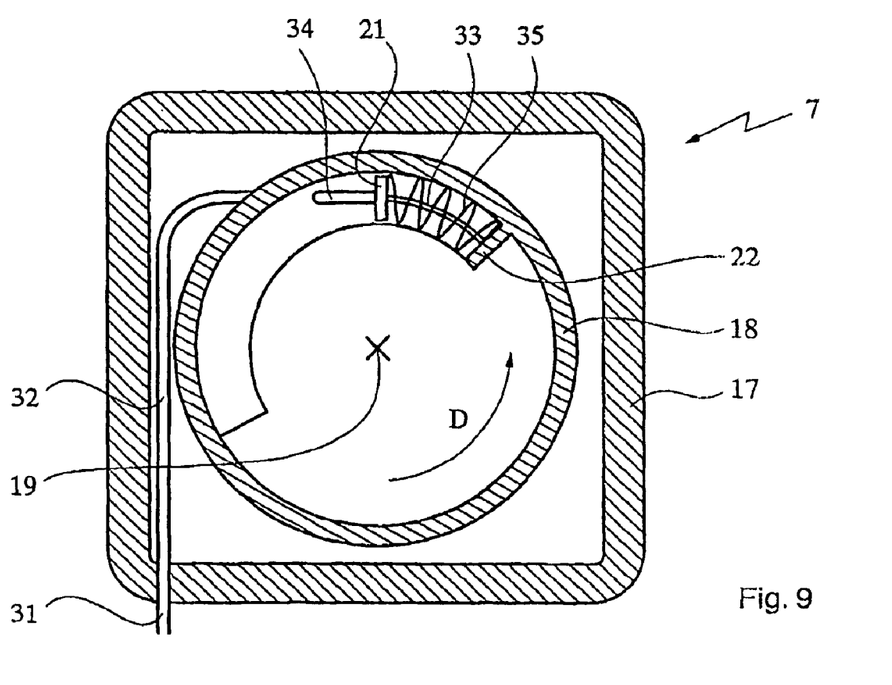
FIG. 9 is a front sectional view of a driving device insertable into the head restraint of FIG. 8 and shown in a second position.

FIG. 9 illustrates the connection of the Bowden cable 32 to the driving device 7. The Bowden cable 32 is connected via its displaceable core 33 to the projection 22 of the rotatable hollow cylinder 18 while its sheath 34 is supported on the tab 21 of the basic body 17. In the event of a rear impact, the core 33 is pulled into the sheath 34 and, in the process, rotates the hollow cylinder 18 in the direction of the arrow D. A resetting compression spring 35 which acts on the tab 21 and projection 22 shifts the head restraint 4 out of the safety position back into the use position after the inertia force is decreased by rotation of the hollow body 18 counter to the direction of the arrow D.

The invention claimed is:

1. A head restraint for a vehicle seat having a backrest, the head restraint comprising:
   a headrest configured to be supported above the backrest by at least one retaining bar, the headrest comprising:
      a basic body;
      a head restraint subsection movable from a use position to a safety position, the head restraint subsection comprising a padded segment which can be shifted in relation to the basic body toward a seat occupant's head; and
   a driving device situated within the headrest and configured to move the head restraint subsection from the use position to the safety position, the driving device having at least two components which are both movable relative to each other, at least one of a first component and a second component of the at least two components having an oblique surface which acts on the other of the first component and the second component of the at least two components, wherein the oblique surface is inclined in relation to a direction of a first force,
   wherein movement of at least one of the first component and the second component under action of the first force transmits a second force on the other of the first component and the second component in a direction which deviates from the direction of the first force, and
   wherein the relative movement between the first component and the second component is translatory and rotary, the first component being rotatable about an axis of rotation that extends in a first direction, and the second component being translatable in the first direction.

2. The head restraint of claim 1, wherein the first and second components can be set into rotation in relation to each other under the action of the first force, with a relative movement of the first and second components in the first direction being producible by the oblique surface.

3. The head restraint of claim 1, wherein both of the first and second components have oblique surfaces which act with each other and are substantially parallel to each other.

4. The head restraint of claim 1, wherein the first force is produced from a mechanical or a chemical potential energy source.

5. The head restraint of claim 1, further comprising a locking device, wherein the second force is produced after release of the locking device.

6. The head restraint of claim 5, wherein the locking device locks the padded segment directly to the basic body.

7. The head restraint of claim 1, wherein the first component is a central component and the second component is rotationally fixed, the driving device further comprises a third component that is rotationally fixed, the central component being rotatable in relation to the third and second components.

8. The head restraint of claim 7, wherein the first, second and third components are arranged telescopically when in the use position.

9. The head restraint of claim 8, wherein the oblique surface is arranged on at least one of an inner and an outer radial surface of at least one of the third component and the second component and is designed in the manner of a thread.

10. The head restraint of claim 1, wherein the first component rotates relative to the second component and applies an axial force onto the second component for shifting the padded segment in the first direction toward the head of a seat occupant.

11. The head restraint of claim 10, wherein the padded segment is shifted forward in the first direction.

12. The head restraint of claim 10, wherein both of the first component and second components have oblique surfaces, the oblique surfaces acting on each other to shift the padded segment in the first direction toward the head of the seat occupant.

13. A head restraint for a vehicle seat having a backrest, the head restraint comprising:
   a basic body configured to be supported above the backrest by at least one retaining bar;
   a head restraint subsection coupled to and supported forward of the basic body, the head restraint subsection being movable relative to the basic body from a use position to a safety position; and
   a driving device arranged between the basic body and the head restraint subsection, the driving device being configured to move the head restraint subsection from the use position toward a seat occupant's head to the safety position, the driving device comprising a first component and a second component, at least one of the first component and the second component having an oblique surface which acts on the other of the first component and the second component,
   wherein movement of at least one of the first component and the second component under action of a first force transmits a second force on the other of the first component and the second component in a direction which deviates from a direction of the first force and moves the head restraint subsection to the safety position,
   wherein the relative movement between the first component and the second component is translatory and rotary, the first component being rotatable about an axis of rotation that extends in a first direction, and the second component being translatable in the first direction.

14. The head restraint of claim 13, wherein the first component and the second component are both movable relative to each other.

15. The head restraint of claim 13, wherein the oblique surface is inclined in relation to the direction of the first force.

16. The head restraint of claim 15, wherein both of the first component and the second component have oblique surfaces that act on each other and are substantially parallel to each other.

17. The head restraint of claim 13, wherein the first component is coupled to the basic body and configured for rotary movement, wherein the second component is coupled to the head restraint subsection and configured for translatory movement, and wherein the rotary movement of first component causes the translatory movement of the second component.

18. The head restraint of claim 17, wherein the translatory movement of the second component is in a direction that is substantially parallel to the axis of rotation of the first component.

19. A head restraint for a vehicle seat having a backrest, the head restraint comprising:
- a basic body configured to be supported above the backrest by at least one retaining bar;
- a head restraint subsection coupled to and supported forward of the basic body, the head restraint subsection being movable relative to the basic body from a use position to a safety position; and
- a driving device arranged between the basic body and the head restraint subsection, the driving device being configured to move the head restraint subsection from the use position toward a seat occupant's head to the safety position, the driving device comprising a first component and a second component, the first component being configured for at least rotary movement and the second component being configured for at least translatory movement, the first component being rotatable about an axis of rotation that extends in a first direction, and the second component being translatable in the first direction,
- wherein rotation of the first component about the axis of rotation under action of a first force transmits a second force on the second component in the first direction and moves the head restraint subsection to the safety position, the first direction deviating from the direction of the first force.

20. The head restraint of claim 19, wherein both of the first component and the second component have oblique surfaces that act on each other to move the head restraint subsection to the safety position.

21. The head restraint of claim 19, wherein the second component is rotatably fixed relative to the head restraint subsection so that the rotation of the first component about the axis of rotation causes the second component and the head restraint subsection to move forward in the first direction toward the safety position.

22. The head restraint of claim 21, wherein the first component is rotatably coupled to the basic body.

* * * * *